(12) United States Patent
Webster et al.

(10) Patent No.: US 10,131,528 B2
(45) Date of Patent: Nov. 20, 2018

(54) FLAVORING DISPENSING APPARATUS, SYSTEM AND METHOD

(71) Applicant: Newco Enterprises, Inc., St. Charles, MO (US)

(72) Inventors: Joseph P. Webster, St. Charles, MO (US); David L. Brandsma, St. Charles, MO (US); Michael Romanyszyn, San Antonio, TX (US)

(73) Assignee: Newco Enterprises, Inc., St. Charles, MO (US)

( * ) Notice: Subject to any disclaimer, the term of this patent is extended or adjusted under 35 U.S.C. 154(b) by 23 days.

(21) Appl. No.: 15/340,445

(22) Filed: Nov. 1, 2016

(65) Prior Publication Data

US 2017/0121164 A1    May 4, 2017

Related U.S. Application Data (60) Provisional application No. 62/249,345, filed on Nov. 1, 2015.

(51) Int. Cl.
*B67D 1/00* (2006.01)
*A23L 2/56* (2006.01)
*B67D 1/08* (2006.01)

(52) U.S. Cl.
CPC .............. *B67D 1/0007* (2013.01); *A23L 2/56* (2013.01); *B67D 1/0894* (2013.01); *A23V 2002/00* (2013.01); *B67D 1/0079* (2013.01); *B67D 1/0881* (2013.01); *B67D 1/0888* (2013.01)

(58) Field of Classification Search
CPC .. B67D 1/0007; B67D 1/0894; B67D 1/0881; B67D 1/0888; B67D 1/0079; A23L 2/56; A23V 2002/00
USPC ......... 222/383.1–383.3, 321.6–321.9, 321.1, 222/144, 135, 144.5
See application file for complete search history.

(56) References Cited

U.S. PATENT DOCUMENTS

| | | | | |
|---|---|---|---|---|
| 2,975,939 A | * | 3/1961 | Russell | A01C 7/06 222/142 |
| 3,015,415 A | * | 1/1962 | Marsh | B01F 13/1058 222/135 |
| 3,122,272 A | * | 2/1964 | Marsh | B01F 13/1055 222/135 |
| 5,351,861 A | * | 10/1994 | Jovellana | B67D 1/06 222/144 |
| 2012/0067921 A1 | * | 3/2012 | Shippen | B67D 3/0025 222/144 |
| 2012/0104037 A1 | * | 5/2012 | Ben-Shoshan | A47G 19/18 222/1 |
| 2012/0175383 A1 | * | 7/2012 | Engels | B01F 7/00216 222/135 |

* cited by examiner

*Primary Examiner* — Donnell Long
(74) *Attorney, Agent, or Firm* — Matthews Edwards LLC (57) ABSTRACT

A flavoring dispensing apparatus, system, and method configured for use with a plurality of pump equipped flavoring containers such as bottles, operable to automatically dispense relatively precise or metered amounts of flavoring, and more specifically concentrated flavoring, into a beverage container, mixing vessel, or other receiver. The containers are easily removed and replaced and flavoring levels can be automatically monitored for replacement with a fresh container.

29 Claims, 10 Drawing Sheets

FLAVORING DISPENSING APPARATUS, SYSTEM AND METHOD

This application claims the benefit of U.S. Provisional Application No. 62/249,345, filed Nov. 1, 2015.

TECHNICAL FIELD

This invention relates generally to a flavoring dispensing apparatus, system, and method, and more particularly, that is configured for use with pump equipped flavoring containers, to dispense relatively precise or metered amounts of flavoring, and more specifically concentrated flavoring, into a beverage container, mixing vessel, or other receiver.

BACKGROUND ART

The disclosure of U.S. Provisional Application No. 62/249,345, filed Nov. 1, 2015, is hereby incorporated herein in its entirety by reference.

There are a variety of machines in the commercial beverage dispensing industry and particularly the coffee and tea industry which produce different types of beverages, and also a variety of means to enhance the flavor of the dispensed beverage by adding either a powdered ingredient or a liquid ingredient.

It is commonplace in the industry to add flavoring to the coffee or tea prior to mixing with hot water, in which case the flavor would infuse the entire batch of beverage produced. Another common means of changing the flavor is by means of small flavor pouches which are added to the beverage after it has been poured into the beverage container. Another common means of flavor addition uses small amounts of concentrated flavored liquid dispensed from containers such as bottles into the beverage container.

Bottles of the concentrated liquid flavoring ingredient come in a variety of sizes and concentration ratios and can be cumbersome to locate, check contents and dispense the correct amount of desired liquid to get the desired flavor for the amount of beverage in the container. As representative examples in the coffee and tea industry, single serving containers typically come in sizes such as 8 ounces, 12, ounces, 16 ounces and the like, and it is often required to use one flavor apparatus with all of the sizes of containers at a particular dispensing location.

To regulate the dispensing the liquid flavoring ingredients from bottles, canisters, and other containers, a variety of powered pumps or pressure systems are employed to cause the liquid flavoring to dispense into a beverage container, including automatically, responsive to a user input such as the pushing of a selector button. A disadvantage is that these types of dispensing means is that often involve complicated and messy methods of changing out the empty bottle or canister containing the spent flavoring and replacing with a replenished bottle or canister, which can be labor intensive.

As an example, some known dispensers use peristaltic pumps, delivery tubes or delivery hoses, all of which need to be cleaned when the container is changed and maintained during periods of non-use to prevent caking of dried out flavoring concentrates, which can be labor intensive.

Furthermore, some delivery systems using canisters require machine maintenance to change out the used canister and rethreading the hose prior to the resumption of use of the replenished canister, which is also time consuming.

It is thus desired to have a manner of changing flavoring containers simpler, quicker, more efficiently, and at less cost.

As another consideration, counter space in beverage preparation areas of restaurants is typically limited and thus it is desirable for flavoring dispensing apparatus to occupy as little space as is practicable, both in the horizontal and vertical dimensions.

Therefore a need exists for a more desirable apparatus and method of storing and dispensing multiple types of flavorings, particularly liquid flavorings, which is dimensionally compact, requires minimal labor to change and maintain, so as to overcome one or more of the disadvantages and shortcomings set forth above.

SUMMARY OF THE INVENTION

What is disclosed is an apparatus, system, and methods of storing and dispensing multiple flavorings, and particularly liquid flavorings, which is dimensionally compact, requires minimal labor to change and maintain, so as to overcome one or more of the disadvantages and shortcomings set forth above.

According to a preferred aspect of the invention, a flavoring dispensing apparatus utilizes easily installable and replaceable flavoring filled containers such as bottles each equipped with dispensing apparatus, including, but not limited to, a pump configured to meter a known amount of flavoring ingredient with a predetermined movement, such as a stroke or other known action of the pump.

According to another aspect of the invention, the apparatus, system, and method of the invention facilitate selection of the desired flavor by incorporating a motorized carousel that carries the flavoring filled bottles or other containers, so as to provide a storage location for multiple flavors, as a non-limiting example, 10 bottles in the embodiment illustrated, although carousel arrangements configured to hold more or less number of flavoring bottles can be utilized.

According to another preferred aspect, the carousel will be driven to rotate using a suitable rotary driver controlled by a suitable controller such as a microprocessor based controller, in a manner to index a desired one of the flavoring bottles in a predetermined designated dispensing position, with rotational positional information generated and inputted to the controller so that desired bottle is accurately positioned for dispensing.

As non-limiting examples, the rotary driver can include a gear motor, servo motor, stepper motor, or the like, and any of a variety of rotary position sensors can be employed such as an optical or mechanical resolver, Hall effect sensor, counter, or the like, to provide rotational position feedback to the controller to enable it to accurately rotate the carousel to selectively position a desired flavoring bottle in position where the desired flavor can be dispensed into a beverage container.

According to an optional aspect of the invention, the individual flavoring bottles can also carry indicia, such as a bar code, 2D symbol code, or the like, and the apparatus can include a suitable reader in connection with the controller so that by rotating the carousel the identity of the flavor of a bottle at a position on the carousel can be determined.

According to another preferred aspect, the invention can be configured to allow users to select the size of the amount or dose of the flavoring ingredient into the beverage container or other receiving container, for example, using a simple input such as a selector button or switch, touch screen input, or the like.

As another optional aspect of the invention, the apparatus can include suitable sensing capability to automatically determine container size, e.g., 8 ounce, 12 ounce, or 16 ounce, and automatically determine an appropriate flavoring amount to be added, as non-limiting examples, using sensors operable to determine the mass of the container, determine optically or with switches, the size of the container, e.g., the height, or based on an earlier user selection, or a code on the container such as a bar or 2D code carried on the container and readable by a suitably located reader connected to the controller.

According to another preferred aspect of the invention, a manner of delivering a desired dose of flavoring is utilized. As a non-limiting example, a dispenser driver is disposed in predetermined relation to the dispensing position, and is automatically operable to engage and operate the pump of the bottle at the dispensing position. This contact can be direct, or indirect using a suitable linkage or other apparatus. As a non-limiting example, a solenoid plunger apparatus can be employed as the driver, to either directly contact an element of the pump on the bottle, or indirectly contact it via a lever, cam, and/or other suitable mechanism. As another example, the driver can comprise a motor or actuator, such as a linear or rotary actuator, gear motor, servo motor, stepper motor, or the like.

As one preferred embodiment, a stepper motor or other suitable dispenser driver is automatically controlled by the controller to rotate a lobe, wedge, or ramp shaped cam which engages an actuating element such as an arm or lever to engage an element of the pump of the flavoring bottle at the dispensing position, e.g., in a pivoting action, to dispense the desired metered dose of flavoring into a container disposed in predetermined relation to the bottle in the dispensing position.

The actuating element can be disposed above or below the bottle at the dispensing position. If above, the actuating element can be positioned and configured to engage the pump element in a required manner, typically in a downward action, such as in the manner of a lever, affording application of mechanical advantage. If the actuating element is disposed below the flavoring bottle, it can be configured e.g., as an arm or lever, to lift it to actuate the pump of that bottle by pressing an element of the pump on the upper end of the bottle against a surface of a member disposed above the dispensing position such as the top of the carousel. That is, the entire bottle is lifted, essentially to depress or displace the pump element.

For the above embodiment, the preferred pump is a piston pump having an element such as a piston rod or plunger in connection with a piston movable or strokable within a cylinder in one direction to draw or suck a metered quantity of liquid flavoring from the bottle through a check valve into the cylinder, and movable strokable in the opposite direction to dispense the liquid flavoring through a dispensing outlet such as a dispensing nozzle incorporated into the element (and the piston rod) and extending above the bottle and sidewardly so as to be oriented to discharge downward to one side of the bottle. Existing flavoring bottles and some consumer products such as condiments such as mustard and catsup are merchandized in pump bottles of the type envisioned for use with the invention.

As an advantage, the discharge nozzles of the pumps of the respective bottles can be captured and held stationary vertically and directed in a predetermined sideward direction, e.g., radially outwardly in relation to an axis of rotation of the carousel, for example, using suitable structure such as receptacles on the carousel shaped to receive and retain the nozzles in the desired orientation. The carousel is configured to allow upward and downward motion of the bottles relative to their respective pump element and nozzle to operate the pumps. Thus an upward movement of the bottle will discharge the quantity of flavoring held in the cylinder of the pump, and a downward movement of the bottle will charge the pump with the next quantity of flavoring, the check valve operating to hold the quantity of flavoring in the cylinder until dispensed for at least some time.

As another preferred aspect, a spring can be employed to hold the end of the actuating element against the cam wedge. The spring can be a component of the pump, such as commonly employed to return the pump element, e.g., piston rod to its normal or up position after being depressed to dispense flavoring. In this embodiment the spring would be employed additionally to help lower the bottle to its lower or normal position.

As an attendant advantage of the above described configuration, the rotary driver and the dispenser driver can both be disposed in the center region of the carousel to economize the apparatus dimensionally. As an example, the rotary driver can be stacked above the dispensing driver and surrounded by the bottles carried on the carousel.

As another optional embodiment, the bottles can be oriented to have the dispensing nozzles below, and the stacked positions of the rotary and dispenser drivers reversed, and the apparatus can be located above the container to be filled.

According to another preferred aspect of the invention, the removal of empty flavoring bottles and insertion of a fresh flavoring bottle is accomplished by means of a rotating cuff. The rotating cuff allows the bottles to be retained in the carousel when the cuff is rotated in one direction, while allowing the bottle to be removed and replaced when rotated in a counter direction.

As a preferred operational aspect of the invention, the controller can automatically monitor cycles of operation of the respective flavoring bottles, e.g., the stroking of the respective pumps thereof, to estimate or count usage and need for replacement. The controller can automatically monitor parameters such as elapsed time to estimate whether the pumps remain primed with flavoring, or need to be recharged. Energy usage by the dispensing driver and/or time of operation for dispensing flavorings from the respective bottles can be monitored and/or regulated as a function of viscosity of a particular flavoring liquid, and for diagnosing problems such as dryness, accumulation of dried residue, stickiness of operation, etc., as well as other purposes. The apparatus can also be automatically cycled when a bottle or bottles are replaced so as to be primed with flavoring and ready for use.

DETAILED DESCRIPTION OF PREFERRED EMBODIMENTS OF THE INVENTION

Referring now to FIGS. 1-10 of the drawings, the following is a list of parts of a preferred embodiment of the invention:

PARTS LIST dispense spout 1
stationary plate 2
spacer 3
piston assembly 4
bottle body 5
flavoring bottle 6
support gantry 7
support roller 8
carousel assembly 9
lower carousel plate 9A
cylinder 10
upper carousel plate 11
dispense spout locater 12
center hub 13
bottle holding assembly 14
rotatable cuff 15
fixed collar 16
bottle lifter 17
permanent magnet 18
sensor 19
lower driveshaft 20
pivot axle 21
lift arm 22
cam 23
motor 24
motor 25
drive coupling 26
selection panel 27
selection panel 28
cup rest 29
dispensing apparatus 30
recessed cup placement area 31
positioning ring 33
rotary driver 34
dispenser driver 36
lift mechanism 37
sensor 38
controller 39

As a general description, an embodiment of a flavoring dispensing apparatus 30 designed and configured to dispense a predetermined amount of a flavoring ingredient from a bottle equipped with a piston pump assembly 4 is shown. The bottles 6 of liquid flavoring of different varieties are arranged around a carousel assembly 9. The carousel assembly 9 is equipped with automatic drivers which, responsive to an input, can position the desired flavoring bottle 6 in a dispense position and drive the pump assembly 4 of that bottle individually to dispense the desired amount of the selected flavor into a beverage container or other receiver such as a cup or the like (not shown).

The dispensing apparatus 30 comprises a cabinet having a user interface having at least one user input device, here preferably one or a pair of selection panels 27 and 28, which can be a switch or button or array of switches and/or buttons, a touch panel, rotary selector, or the like, connected to or incorporating a microprocessor operated controller 39, e.g., in a suitable control unit or module which, responsive to the user input or selection, is programmed to automatically control a rotary driver 34 including suitable drive motor or actuator, e.g., stepper motor, in a programmed operation to rotate the carousel assembly 9 about a central rotational axis A, carrying a plurality of flavoring bottles 6 to a bring a specific flavoring bottle 6 to a dispensing position (or station) where a dispenser driver 36, including another suitable drive motor or actuator, e.g., stepper motor, is then automatically controllably operated by the controller to actuate a rotary cam 23 to move an actuator, e.g., a lift arm 22, which can be, but is not limited to, a cantilever pivoting or lever arm pivotable about a pivot axle 21, to lift the bottle 6 at the dispense position, which acts to depress or stroke a plunger or piston rod of the pump assembly 4 into a cylinder within a cylinder or cavity of the pump assembly within or in the opening of body 5 of the selected bottle 6 to pump a predetermined quantity of the flavoring contents thereof into a beverage container, preferably, but not limited to, situated on a cup rest 29 within a recessed cup placement area 31 on the front or other convenient region of apparatus 30, which is beside or just radially outwardly of the dispense position of the carousel assembly 9.

The rotatable carousel assembly 9 is preferably equipped with a device or devices to securely hold the bottles in position about the axis, here preferably a plurality of bottle holding assemblies 14, for individually releasably holding flavoring bottles 6 in a desired position and orientation, preferably by a bottom or base of the individual bottle, utilizing fixed positioning collars 16 which hold the individual flavoring bottles 6 in place as they are rotated in and out of the dispense position. Bottle holding assemblies 14 each preferably comprises a rotatable cuff 15 which rotates from a frontal or radial outward locking position to a rearward or radial inward position which allows an empty flavoring bottle 6 to be exchanged with a fresh flavoring bottle 6.

The controller 39 of apparatus 30 can be located anywhere on apparatus 30, e.g., integrated into or with a selection panel 27 and/or 28 for instance in an onboard control unit or module, or can be located remotely, and connects with rotary driver 34 and dispenser driver 36, in a suitable manner, such as, but not limited to, via a conventional wiring harness which also delivers power, or via a wired or wireless network, e.g., WAN, LAN or CAN, for commanding movements and receiving sensor signals and other feedback, and/or delivering power. The motors 24 and 25 are preferably arranged in a stacked arrangement centrally within carousel assembly 9, motor 25 of driver 34 preferably being located above motor 24 of driver 36 in the center of carousel assembly 9, for compactness and efficiency. Suitable sensors are provided to track the position of the carousel assembly 9, such as, but not limited to, an electronic sensor operable to sense the presence of positioning cuts or other positional indicators in a circular drive hub, positioning ring, or other suitable location. The lower stepper motor 24 drives cam 23, the position of which is determined by a stationary sensor mounted in the motor support frame or other suitable location, such as, but not limited to a Hall effect sensor, and an associated actuating magnet can be located in or on the cam 23, for tracking each rotation. Any other sensor capable of determining rotational position and counting rotations accurately can also be used. Each rotation of the lower motor 24 causes a feature on cam 23 such as a lobe, ramp, wedge, etc., to raise a lift arm 22, which is preferably arranged as a lever or cantilever mounted pivoting arm which raises only the flavoring bottle 6 at the dispense location to actuate, e.g., stroke, piston pump assembly 4 mounted on the flavoring bottle 6 which as a result dispenses a predetermined amount of flavoring ingredient preferably in a liquid e.g., low viscosity, syrup, paste, etc., into a beverage container positioned in the front of the machine. The microprocessor controller 39 can be programmed to automatically prime, allow manual priming of, fresh bottles before use, the amount of liquid dispensed into the receiving container, and the amount of dispensed liquid being determined so that it is known when a bottle is nearly empty, and to send a signal to the user interface that the bottle should be brought to the dispense position or another location so that empty bottle can be exchanged for a fresh bottle.

Figure 1:
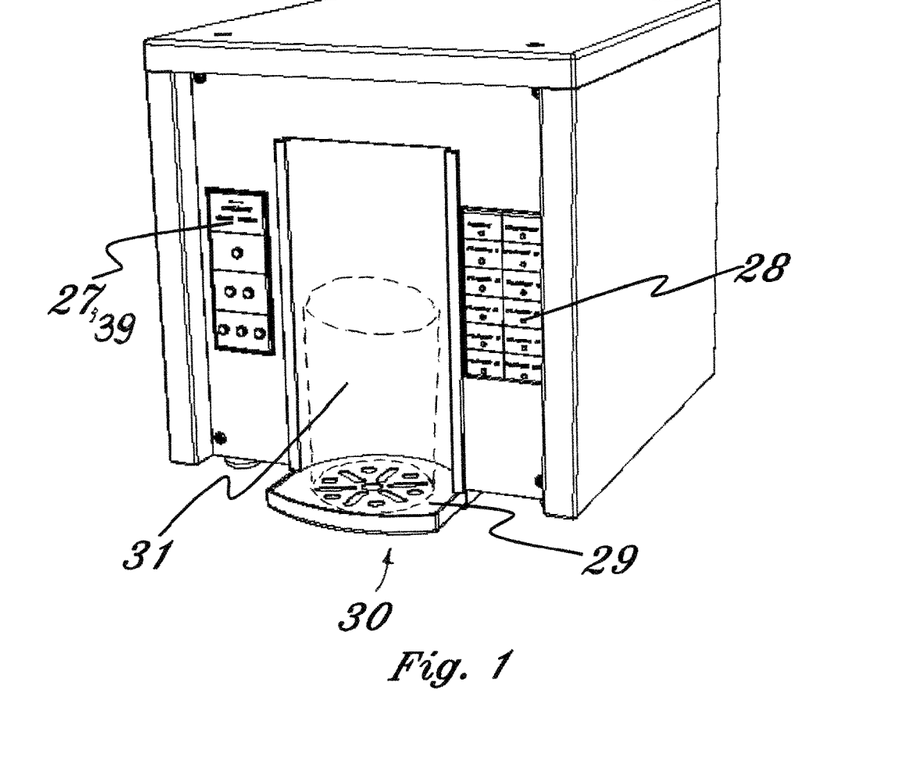
FIG. 1 is a perspective view of one embodiment of a flavoring dispensing apparatus of the invention.

FIG. 1 shows flavoring dispensing apparatus 30, including user selection panels 27 and 28 integrated with a microprocessor controller 39 into a control module, the panels being usable by a person for selecting flavoring and optionally flavoring strength. The apparatus is equipped with a cup rest 29 and a recessed cup placement area 31 for conveniently holding a cup or other receiving container shown in dotted lines.

Figure 2:
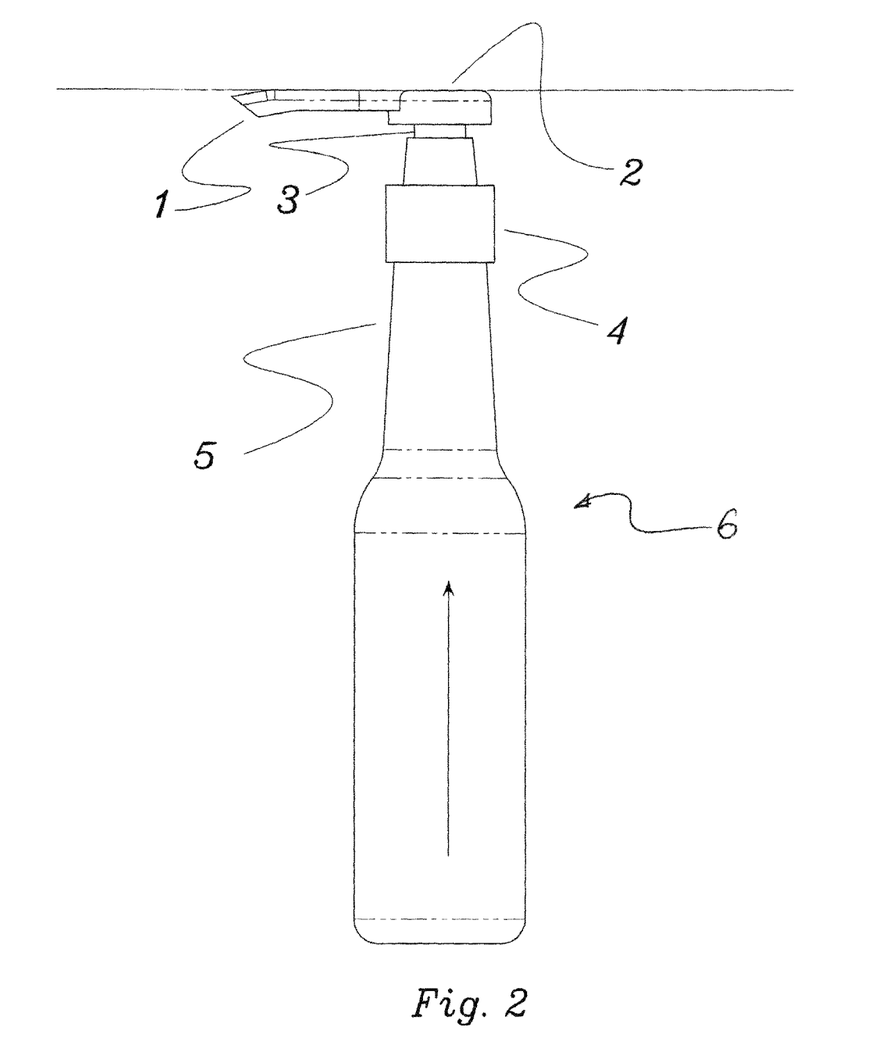
FIG. 2 is a side view of a flavoring container which is a bottle for use with the apparatus of the invention illustrating with an arrow how flavoring is dispensed from the bottle.

FIG. 2 is a side view of a flavoring dispensing bottle 6 comprising the bottle body 5, and piston pump assembly 4 which screws or otherwise suitably fastens on to the top of the bottle. The piston pump assembly is pushed or stroked into body 5 to pump contents of the bottle from an outlet of a dispense spout 1 in the well known manner, the length of a stroke of the piston pump 4 and thus quantity of flavoring ingredient pumped being determined in a suitable manner such as by a spacer 3 between the piston pump assembly and the dispense spout 1. As a result, upward movement of the bottle body 5 (see arrow) pushes or strokes assembly 4 into the body 5 until contact with spacer 3, as the dispense spout 1 is held in place by a stationary plate 2 which is incorporated at a fixed height into an upper region of the carousel assembly 9 or other suitable structure.

Figure 3:
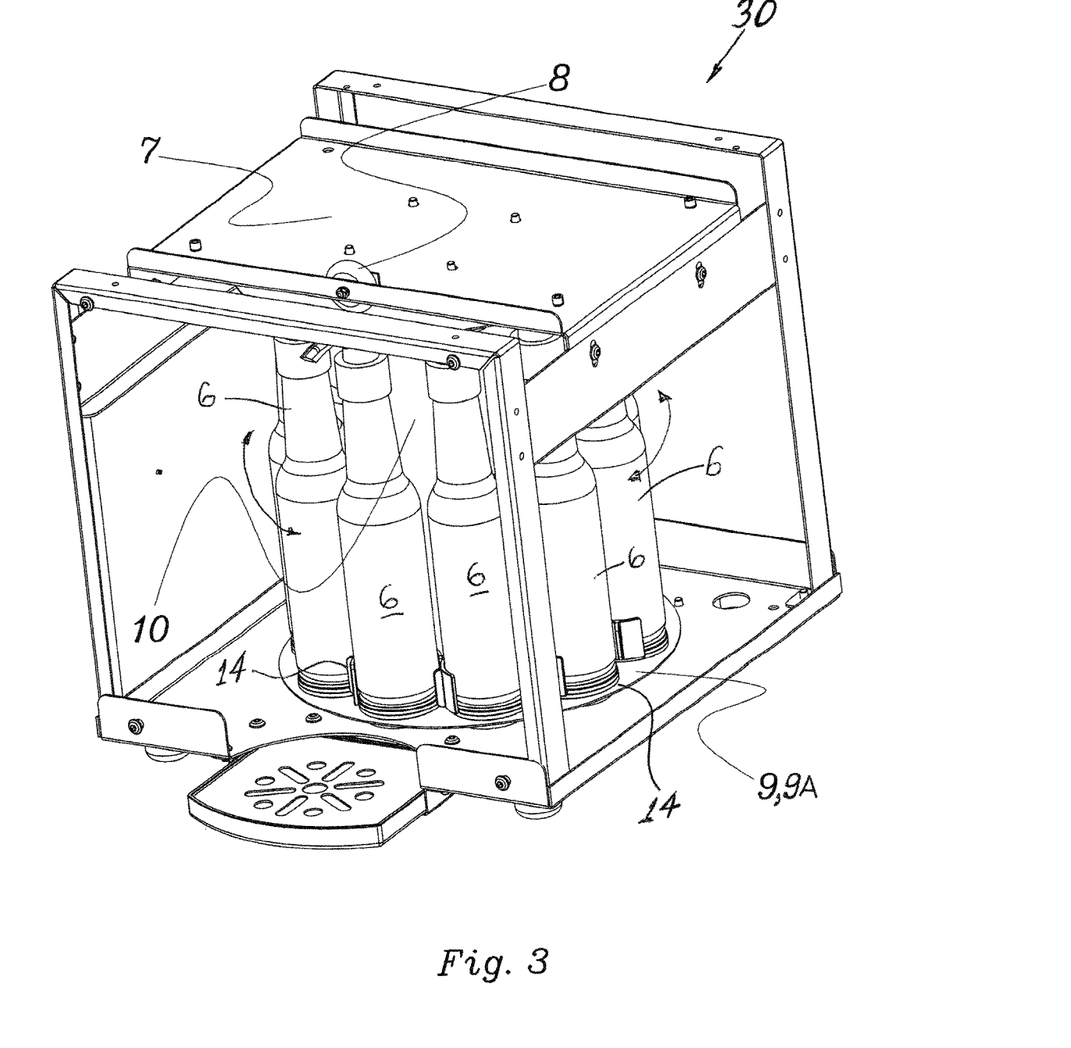
FIG. 3 is a perspective view of the flavoring dispensing apparatus of FIG. 1 with covering panels removed, showing aspects of supporting structure including a rotary carousel supporting a plurality of flavoring bottles.

FIG. 3 shows the dispensing apparatus 30 without covering panels, showing aspects of the structure of the apparatus. The carousel assembly 9 is shown in dispensing position where a fixed support roller 8 is held in place by a support gantry 7. A central cylinder 10 containing the rotary driver drives the carousel assembly 9 holding bottles 6 on a lower carousel plate 9A in a circular direction about a central rotational axis A (see FIG. 4), as denoted by curved arrows.

Figure 4:
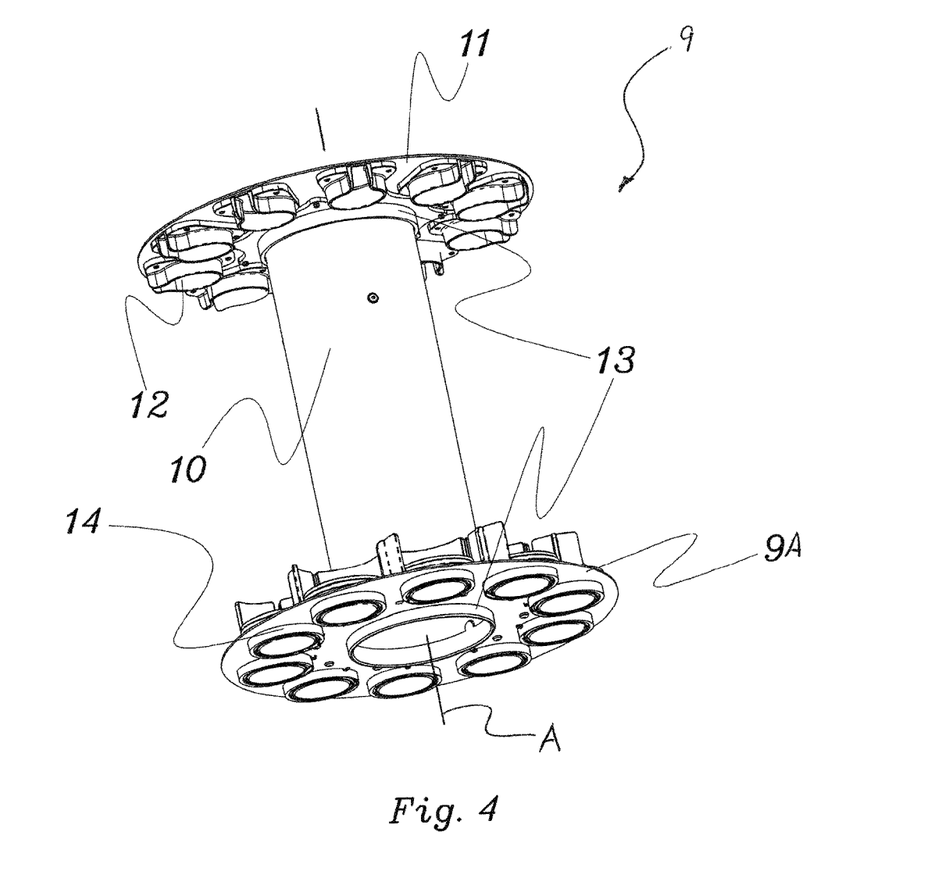
FIG. 4 is a perspective view of one embodiment of a carousel according to the invention for holding a plurality of flavoring dispensing bottles about a central rotational axis of the carousel.

FIG. 4 is an isometric view of the carousel assembly 9 which depicts the cylinder 10 capped by center hubs 13 which are affixed to an upper carousel plate 11 and lower carousel plate 9A. Dispense spout locators 12 are fastened to the upper carousel plate 11. Bottle holding assemblies 14 are mounted in cutouts in the lower carousel plate 9A.

Figure 5:
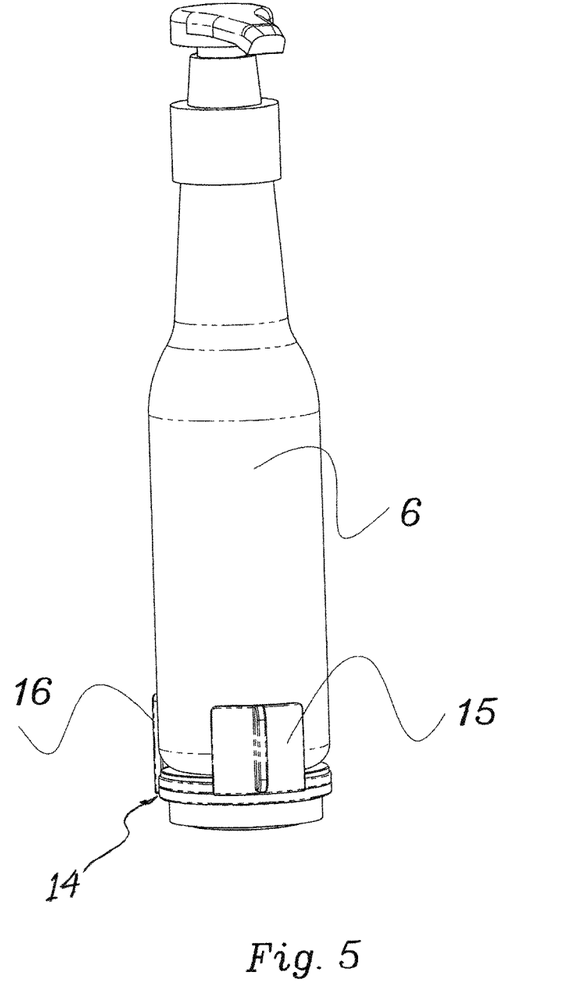
FIG. 5 is a perspective view of a bottle being secured in a lower positioning collar and rotating cuff of the carousel.

FIG. 5 is a front view of a flavoring bottle 6 held in place by a fixed collar 16 and a rotatable cuff 15 of a bottle base assembly 14. A small detent holds the cuff 15 in position until released. This view depicts the bottle 6 held in a fixed position for dispensing.

Figure 6:
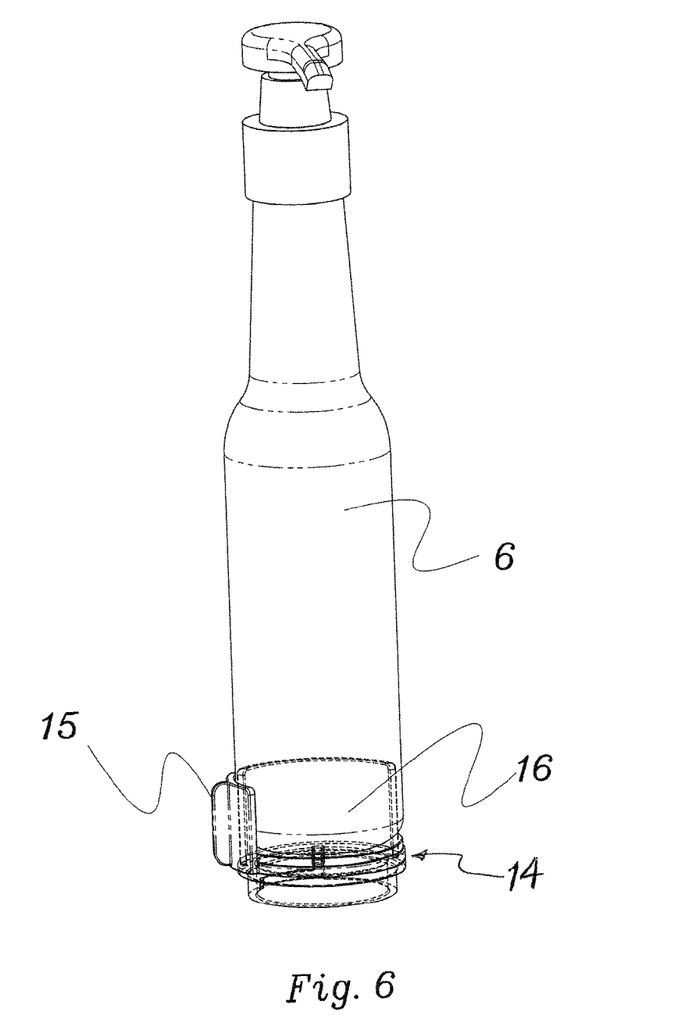
FIG. 6 is another perspective view of a bottle on the lower positioning collar, with the rotating cuff rotated to allow removal of the bottle.

FIG. 6 is a front view of a flavoring bottle 6 held in place by a bottle holding assembly 14 including fixed collar 16 and rotatable cuff 15 which has been rotated around the side of the bottle 6 allowing the bottle to be removed from the bottle holding assembly 14.

Figure 7:
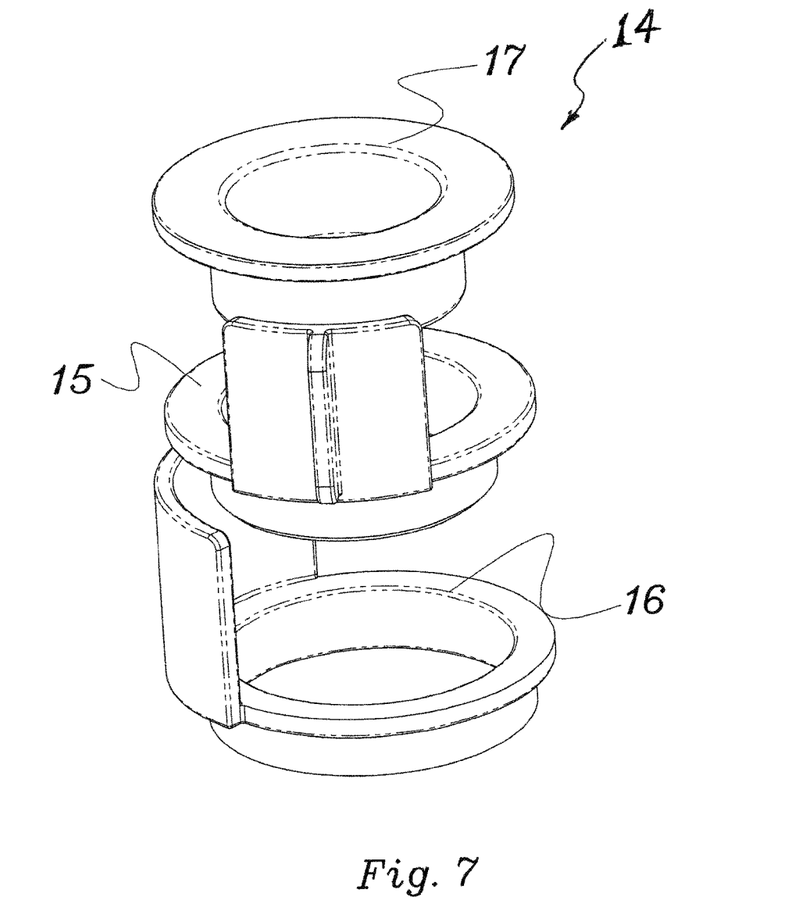
FIG. 7 is an enlarged exploded perspective view of the lower positioning collar and rotating cuff, illustrating how they assemble and allow lifting of a bottle (not shown).

FIG. 7 is an exploded view of the bottle holding assembly 14 showing the fixed collar 16, the rotatable cuff 15 and the bottle lifter 17. The bottle (not shown) sits on top of the bottle lifter 17 and move up and down therewith.

Figure 8:
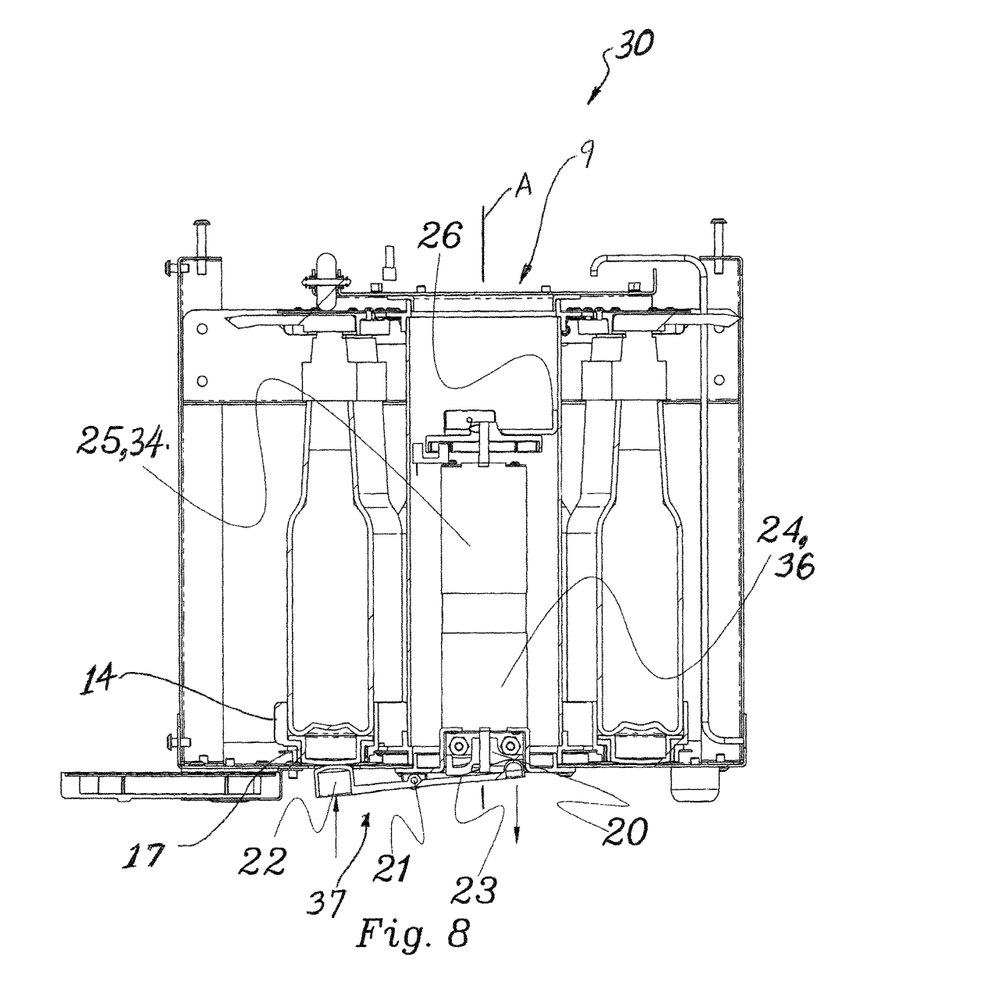
FIG. 8 is a simplified cross sectional view showing aspects of the apparatus of FIG. 1 showing representative flavoring bottles supported on the rotary carousel, a rotary driver, a dispenser driver, and lifting mechanism of the invention.

FIG. 8 is a cross sectional view of the flavoring apparatus 30 showing a rotary driver 34 including an upper stepper motor 25 which drives a drive coupling 26 which is fastened to the cylinder 10 of the carousel assembly 9, enabling the carousel assembly to rotate in a circular motion placing the flavoring bottles as shown in FIG. 5 to align with a lift arm 22 of a lift mechanism 37 of the apparatus. The lifting motion of the lift arm 22 is controlled by the shape and height of the lobe of cam 23 turned by a lower drive motor 24 and a lower drive shaft 20 of a dispenser driver 36. The arm 22 here is pivotable and held in place by a pivot axle 21 which allows arm 22 to cantilever pivot in an up and down movement depending on the position of the rotating lobe of cam 23. In an up position or range of up positions, a button on the end of lift arm 22 engages bottle lifter 17 on which the bottle at the dispense position rests, to lift the bottle to stroke the pump to dispense a quantity of flavoring ingredient.

Figure 9:
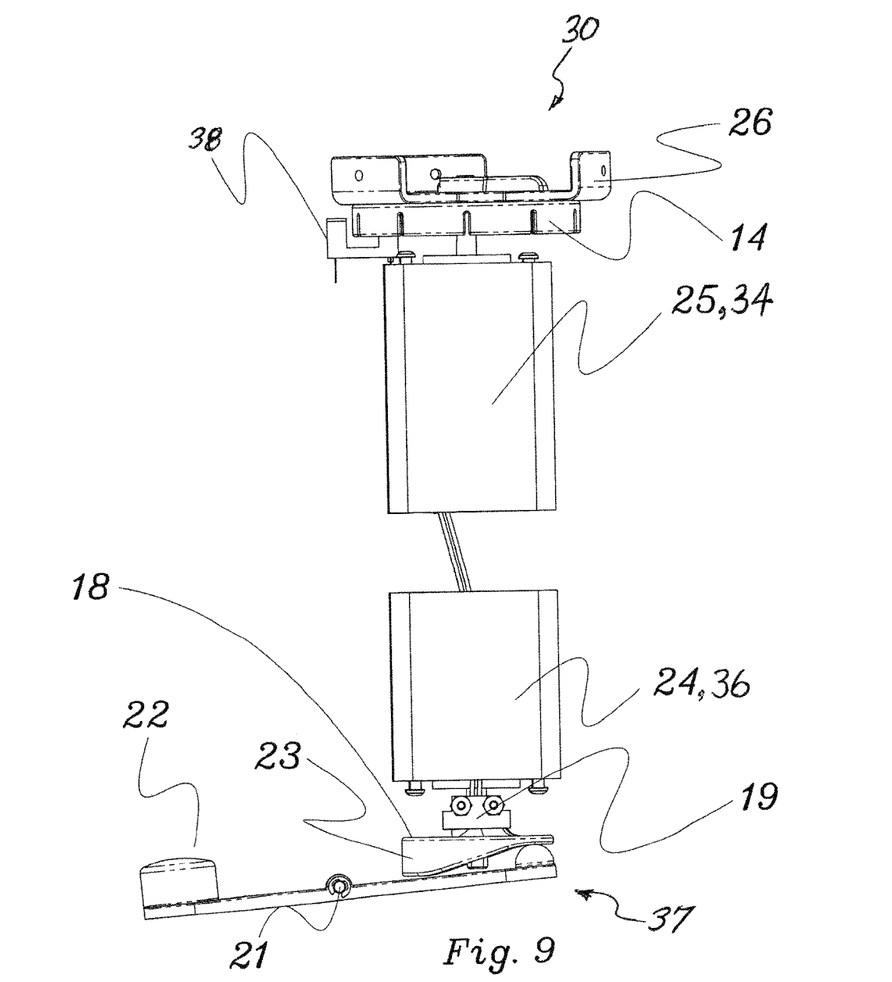
FIG. 9 is a simplified side view of aspects of the apparatus of FIG. 1, including the rotary driver, dispenser driver, and lift mechanism including a rotary cam, lift arm, and position sensors, with the lift arm in a non-dispense or lower position.

FIG. 9 is a simplified side view of the rotary driver 34 and dispenser driver 36 and associated components of dispensing apparatus 30. The drive coupling 26 which is coupled to a positioning ring 33 is driven in a circular direction by the upper drive stepper motor 26. The rotary position of carousel assembly 9 is determined by a suitable sensor 38 or motor feedback. Here, as a non-limiting example, sensor 38 can be a trip light sensor positioned to detect cuts in a positioning ring 33 that rotates with the carousel assembly 9 and sends a signal to controller 39 which can be decoded by the microprocessor to determine the position of the carousel assembly 9 (FIG. 4). As an alternative, sensor 38 can comprise a code reader such as a bar code or two dimensional code reader that can read a code on the bottles as they pass. This can be used to also identify the individual bottles and their contents as well as other information associated with the code. An optical sensor 38 could also be used to read or recognize text and/or colors. The lifting motion of the pivoting lift arm 22 is controlled by the position of the rotating lobed cam 23 which position is determined by an appropriate sensor 19 which as a non-limiting example can be a magnetic reed switch sensor operable to detect presence of a permanent magnet 18 embedded in the rotating lobed cam 23 and which sends a signal which can be decoded by the controller to determine the position of the rotating lobed cam 23. Various alternative sensor could also be employed. Each rotation of the rotating lobed cam 23 causes an interference on the rear portion of the lift arm 22 to rock in a cantilever movement about the pivot axle 21. The position of the pivoting lift arm 22 as shown here in FIG. 9 is the lower or resting, non-dispensing position.

Figure 10:
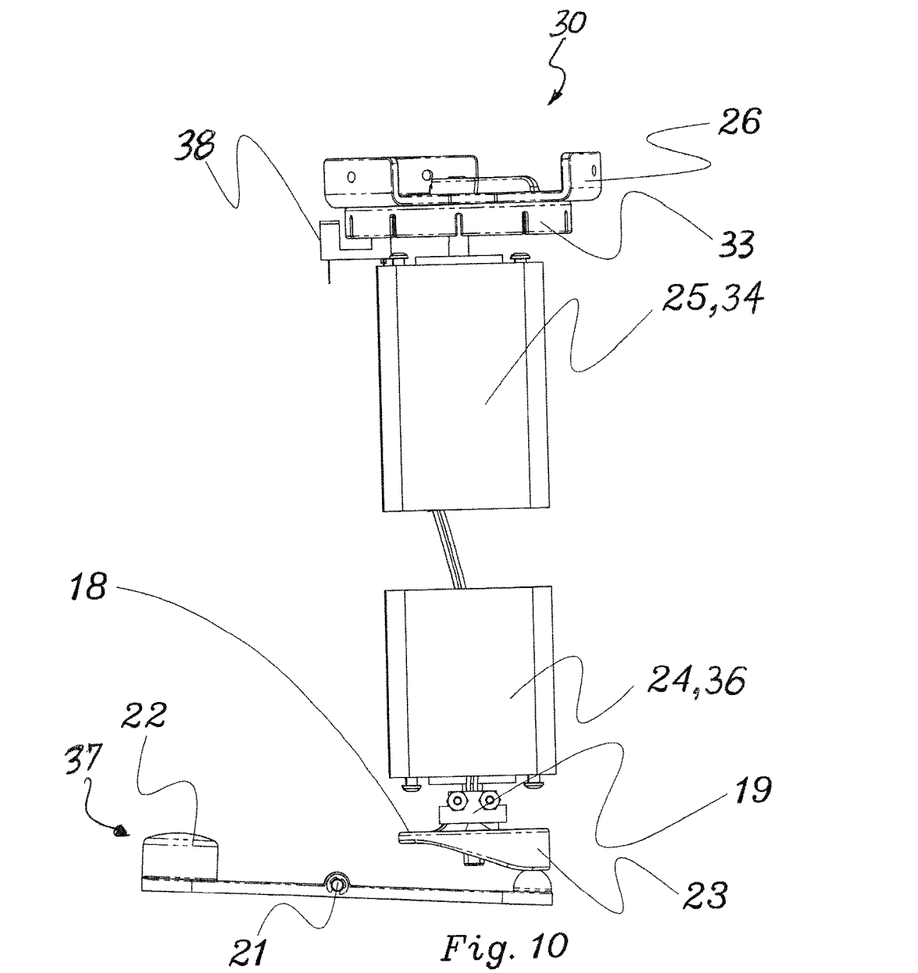
FIG. 10 shows the same view as FIG. 9 with the lift arm in a dispense or upper position to lift a bottle (see FIG. 8).

FIG. 10 is a side view of the motors 24 and 25 and related assemblies, drive coupling 26 of driver 34 and driver 36 as shown in FIG. 9 but with the lift arm 22 of lift mechanism 37 shown in an upper or dispensing position. Sensor 19 is shown in relation to permanent magnet 18 or other feature of the cam 23 or related structure for sensing this rotational position of the cam. The cam is configured to be rotated once for each pump of the flavoring ingredient into a receiving container, and the number of pumps can be determined from user inputs or stored information, e.g., to set the desired flavoring strength for a particular selection. The pumps can also be preset for other functions such as for priming a newly installed bottle so that when subsequently used to flavor a beverage the dose or amount of flavoring ingredient dispensed is full and accurate. This information can also be combined with other information such as cumulative counts for a particular container, and feedback from the associated motor control to determine remaining contents, dispensing problems due to dried or accumulated flavoring ingredient inhibiting delivery from spout 1 or problems in pump assembly 4. E.g., motor feedback and sensor output, e.g., time to complete a revolution to lift a bottle, and/or rotational speed, voltage, or current measured to determine the amount of power and/or force required to dispense. Also, number of rotations and power, time, etc. parameters can be used to determine a value representative of remaining mass of the bottle to provide metrics of usage and for predicting replacement.

As additional embodiments, it is contemplated that carousel assembly 9 can be inverted. In one alternative embodiment the dispense spout locators 12 can be located on the lower carousel plate 9A and the bottle base assemblies on the top so that the bottles are held in an inverted orientation. In another embodiment the lifting mechanism can be inverted and located at the top to press down on pump assemblies of upright bottles for dispensing from the top. Thus it should be apparent that the carousel 9 can be variously configured with the bottle holding elements on the top or bottom and the lifting mechanism on the same or opposite end, for employing bottles in a desired dispensing orientation and manner of pumping. The apparatus 30 can additionally employ an operator usable input device on panel 27 or 28, or suitable sensor such as an optical sensor array to determine container height, or a pressure pad to sense mass, associated with cup rest 29 or cup placement area 31 to sense a receiving container size, to determine a flavoring ingredient dose or amount to be automatically dispensed by apparatus 30.

In light of all the foregoing, it should thus be apparent to those skilled in the art that there has been shown and described a FLAVORING DISPENSING APPARATUS, SYSTEM, and METHOD. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A dispensing system to dispense a predetermined quantity of a flavoring ingredient into a receiving container based on a user selection of a particular flavoring choice, comprising:
    a plurality of flavoring bottles containing different flavoring ingredients, respectively, supported about a rotatable carousel, the carousel being configured to allow the bottles to be individually lifted, each of the bottles being configured to dispense a predetermined quantity of the flavoring ingredient therefrom when lifted;
    a rotary driver connected to the carousel and controllably operable to rotate the carousel to position any selected one of the flavoring bottles at a predetermined dispense location; and
    a lift mechanism positioned in cooperative relation to the predetermined dispense location and configured to operate to individually lift the bottle at the dispense location when activated by a user selection action or input.

2. The dispensing system of claim 1, wherein the lift mechanism comprises an arm supported to be movable upward to lift the bottle at the dispense location.

3. The dispensing system of claim 2, wherein the arm is supported for upward and downward pivotal movement, and one end thereof is positioned to bear against an element supporting the bottle at the dispense location when the arm is pivotally moved upward.

4. The dispensing system of claim 2, comprising a cam positioned and operable to bear against the arm to cause the upward movement to lift the bottle at the dispense location.

5. The dispensing system of claim 4, comprising a dispenser driver configured and operable to drive the cam to bear against the arm.

6. The dispensing system of claim 5, wherein the cam comprises a rotary cam having at least one lobe and the dispenser driver comprises a rotary device controllably operable to rotate the cam to position the at least one lobe to bear against the arm, respectively, to cause the upward movement to lift the bottle at the dispense location.

7. The dispensing system of claim 5, comprising a sensor disposed and operable to output information representative of a rotary position of the cam.

8. The dispensing system of claim 5, wherein the rotary driver and the dispenser driver are supported generally concentrically in stacked relation about a rotational axis of the carousel.

9. The dispensing system of claim 5, comprising a microprocessor operated controller connected to a user input device configured to receive a user selection action or input and connected in operative control of the rotary driver and the dispenser driver, the controller being configured to automatically operate the rotary driver to position a selected bottle in the dispense position and to subsequently automatically operate the dispenser driver a programmed number of times responsive to a received user action or input.

10. The dispensing system of claim 9, wherein the controller is programmed to count a number of operations of the dispenser driver for each of the bottles to enable determining a remaining amount of the flavoring substances therein, respectively.

11. The dispensing system of claim 9, wherein the controller is programmed to automatically operate the dispenser driver a greater number of times or a lesser number of times responsive to an input indicative of a size of a receiving container or a flavoring dose.

12. The dispensing system of claim 1, comprising a sensor disposed and operable to output information representative of a rotary position of the carousel.

13. The dispensing system of claim 1, wherein each of the bottles comprises a sidewardly directed dispensing opening, and the carousel comprises structure to individually hold the bottles with the dispensing opening thereof facing in a predetermined direction when in the dispense location.

14. The dispensing system of claim 13, wherein the dispensing opening is disposed in a dispense spout of the bottle, and the structure comprises a dispense spout locator configured to generally matingly receive and hold the dispense spout in a generally radially outward facing direction relative to a rotational axis of the carousel.

15. The dispensing system of claim 13, wherein the structure comprises collars that receive the bottles, respectively, and rotatable cuffs associated with the collars that bear against and hold the bottles, respectively, the rotatable cuffs being individually rotatably movable in a predetermined manner relative to the associated collars to release the bottles, respectively, to allow individually removing the bottles from the carousel.

16. The dispensing system of claim 1, wherein each of the bottles comprises a pump operable by the lifting of the bottle relative to an element of the pump to dispense the flavoring ingredient from the bottle.

17. A dispensing apparatus for holding a plurality of pump operated flavoring bottles and for dispensing a predetermined quantity of a flavoring ingredient from a bottle into a receiving container based on a user selection of a particular flavoring choice, comprising:
a carousel assembly supported for rotation about a central rotational axis, and carrying bottle holding assemblies for holding flavoring bottles containing different flavoring ingredients at radial peripheral positions about the axis, the bottle holding assemblies being configured to allow the bottles to be individually lifted for actuating the pump thereof to dispense a predetermined quantity of the flavoring ingredient therefrom;
a rotary driver connected to the carousel assembly and controllably operable to rotate the carousel to position any selected one of the bottle holding assemblies at a predetermined dispense location; and
a lift mechanism positioned in cooperative relation to the predetermined dispense location and configured to operate to individually lift a bottle held by the selected one of the bottle holding assemblies at the dispense location when activated by a user selection action or input.

18. The dispensing apparatus of claim 17, wherein the lift mechanism comprises an arm supported to be movable upward to lift an element of the bottle holding assembly at the dispense location.

19. The dispensing apparatus of claim 18, comprising a cam positioned and operable to bear against the arm to cause the upward movement to lift the element of the bottle holding assembly at the dispense location.

20. The dispensing apparatus of claim 19, comprising a dispenser driver configured and operable to drive the cam to bear against the arm.

21. The dispensing apparatus of claim 19, wherein the cam comprises a rotary cam having at least one lobe and the dispenser driver comprises a rotary device controllably operable to rotate the cam to position the at least one lobe to bear against the arm, respectively, to cause the upward movement to lift the element of the bottle holding assembly at the dispense location.

22. The dispensing apparatus of claim 19, comprising a sensor disposed and operable to output information representative of a rotary position of the cam.

23. The dispensing apparatus of claim 17, comprising a sensor disposed and operable to output information representative of a rotary position of the carousel assembly.

24. The dispensing apparatus of claim 17, comprising a plurality of dispense spout locators carried on the carousel assembly at positions above the bottle holding assemblies, to individually hold dispense spouts of the bottles in a predetermined direction when in the dispense location.

25. The dispensing apparatus of claim 17, wherein the bottle holding assemblies each comprise a collar that receive the bottle, and a rotatable cuff about the collar that bears against and holds the bottle, the rotatable cuff being rotatably movable in a predetermined manner relative to the associated collar to release the bottle to allow removing the bottle individually from the carousel assembly.

26. The dispensing apparatus of claim 17, comprising a microprocessor operated controller connected to a user input device configured to receive a user selection action or input and connected in operative control of the rotary driver and the dispenser driver, the controller being configured to automatically operate the rotary driver to position a selected bottle holding assembly in the dispense position and to subsequently automatically operate the dispenser driver a programmed number of times responsive to a received user action or input.

27. The dispensing apparatus of claim 26, wherein the controller is programmed to count a number of operations of the dispenser driver for each of the bottles to enable determining a remaining amount of the flavoring substances therein, respectively.

28. The dispensing apparatus of claim 26, wherein the controller is programmed to automatically operate the dispenser driver a greater number of times or a lesser number of times responsive to an input indicative of a size of a receiving container or a flavoring dose.

29. A method of dispensing a predetermined quantity of a flavoring ingredient from a flavoring bottle into a receiving container based on a user selection of a particular flavoring choice, comprising steps of:
providing a plurality of flavoring bottles containing different flavoring ingredients, respectively, supported about a rotatable carousel, the carousel being configured to allow the bottles to be individually lifted, each of the bottles being configured to dispense a predetermined quantity of the flavoring ingredient therefrom when lifted;
providing a rotary driver connected to the carousel and controllably operable to rotate the carousel to position any selected one of the flavoring bottles at a predetermined dispense location;
providing a lift mechanism positioned in cooperative relation to the predetermined dispense location and configured to operate to individually lift the bottle at the dispense location when activated by a user selection action or input; and
responsive to a user selection action or input, automatically selecting a flavoring bottle and operating the rotary driver to position the selected bottle in the dispense position and to subsequently automatically operate the dispenser driver a programmed number of times responsive to a received user action or input.

* * * * *